United States Patent [19]

Davis

[11] Patent Number: 4,964,986

[45] Date of Patent: Oct. 23, 1990

[54] MEMBRANE FILTER PLATE

[75] Inventor: Steven S. Davis, Bountiful, Utah

[73] Assignee: Baker Hughes Incorporated, Houston, Tex.

[21] Appl. No.: 487,675

[22] Filed: Mar. 2, 1990

Related U.S. Application Data

[62] Division of Ser. No. 307,436, Feb. 6, 1989, Pat. No. 4,911,839.

[51] Int. Cl.⁵ ............................................. B01D 25/12
[52] U.S. Cl. .................................. 210/231; 210/232; 210/321.64; 210/541
[58] Field of Search .................... 210/231, 321.64, 541, 210/224–230, 232; 100/295–297

[56] References Cited

U.S. PATENT DOCUMENTS 4,608,164  8/1986  Neu ...................................... 210/541

Primary Examiner—Frank Sever
Attorney, Agent, or Firm—Skjerven, Morrill, MacPherson, Franklin & Friel

[57] ABSTRACT

A membrane filter press has a series of filter plates having an imperforate pipped membrane mounted on each side or one side thereof. Inlet ports are provided with a cantilevered retainer which support adjacent portions of the membrane when the membrane is expanded to effect a squeezing of filter cake deposited on filter media carried by pips on the membrane. The retainer may be circular in the case of a center inlet port or linear in the case of a corner inlet port. Corner outlet ports are provided in the filter plate, with the plate having a linear collection groove juxtaposed to an outer edge portion of the membrane so that filtrate flow from around the membrane pips to the collection groove and by passages only in the plate are conveyed to an outlet port. A beaded membrane rib enhances the connection of the membrane in a filter plate groove at a position adjacent to the plate seal face of adjoining filter plates.

4 Claims, 4 Drawing Sheets

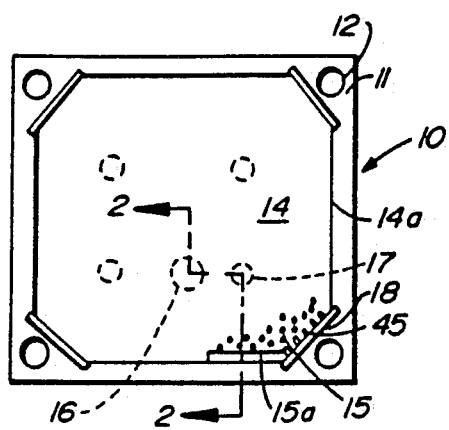
FIG._1
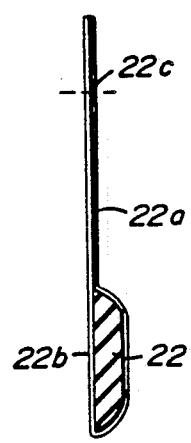
FIG._3
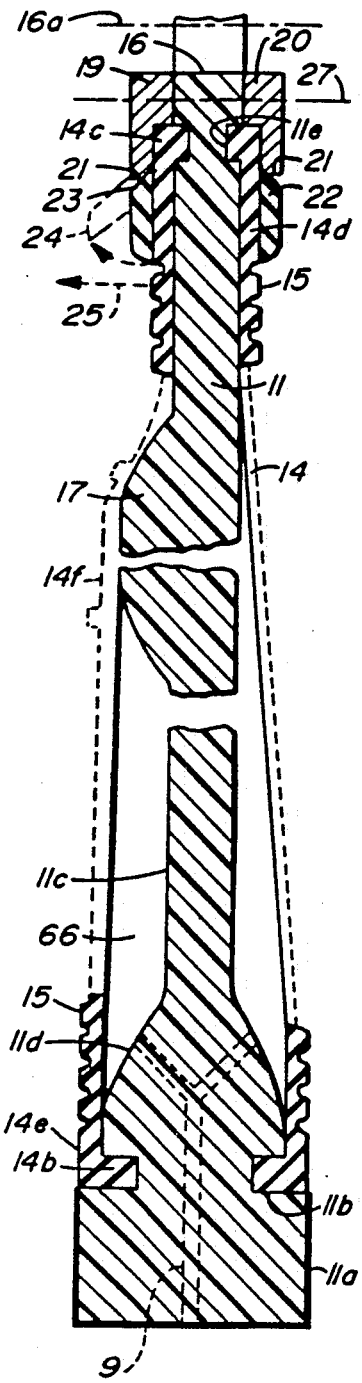
FIG._2

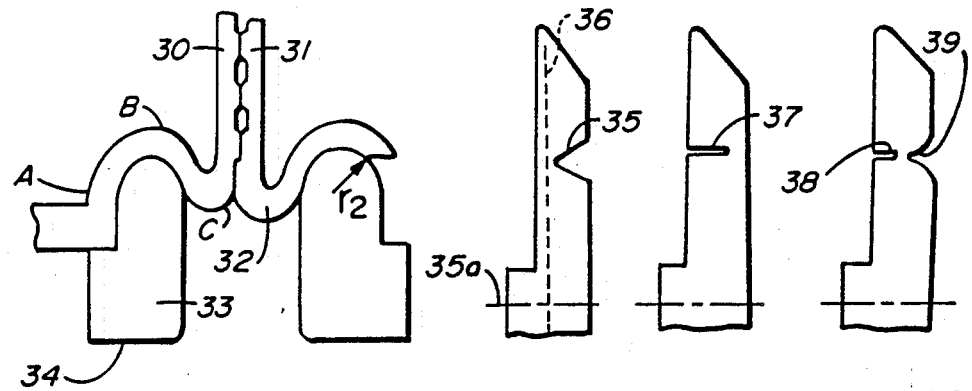
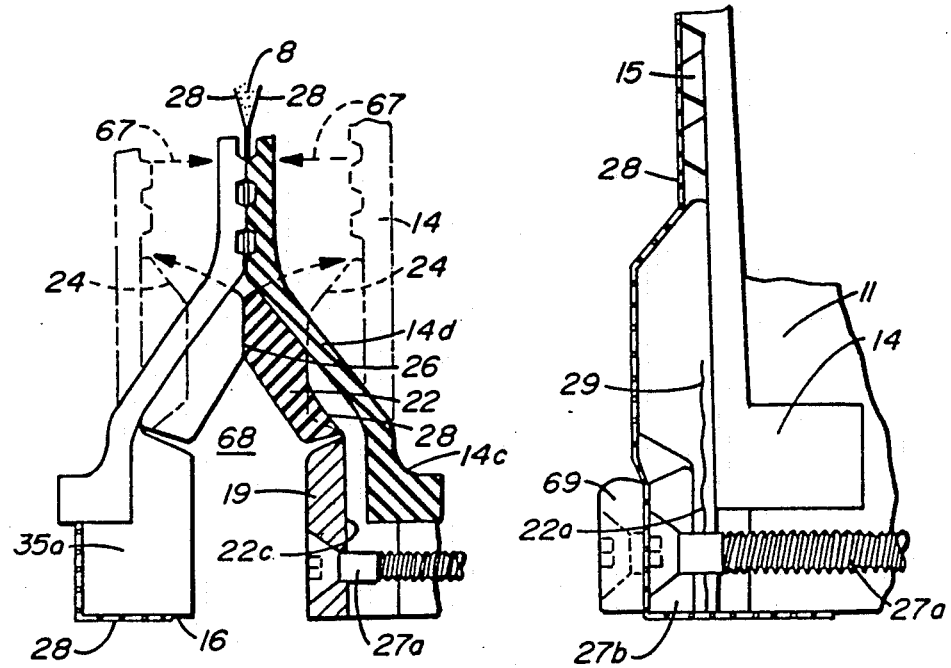
FIG._4 (PRIOR ART)  FIG._7A  FIG._7B  FIG._7C
FIG._5  FIG._6

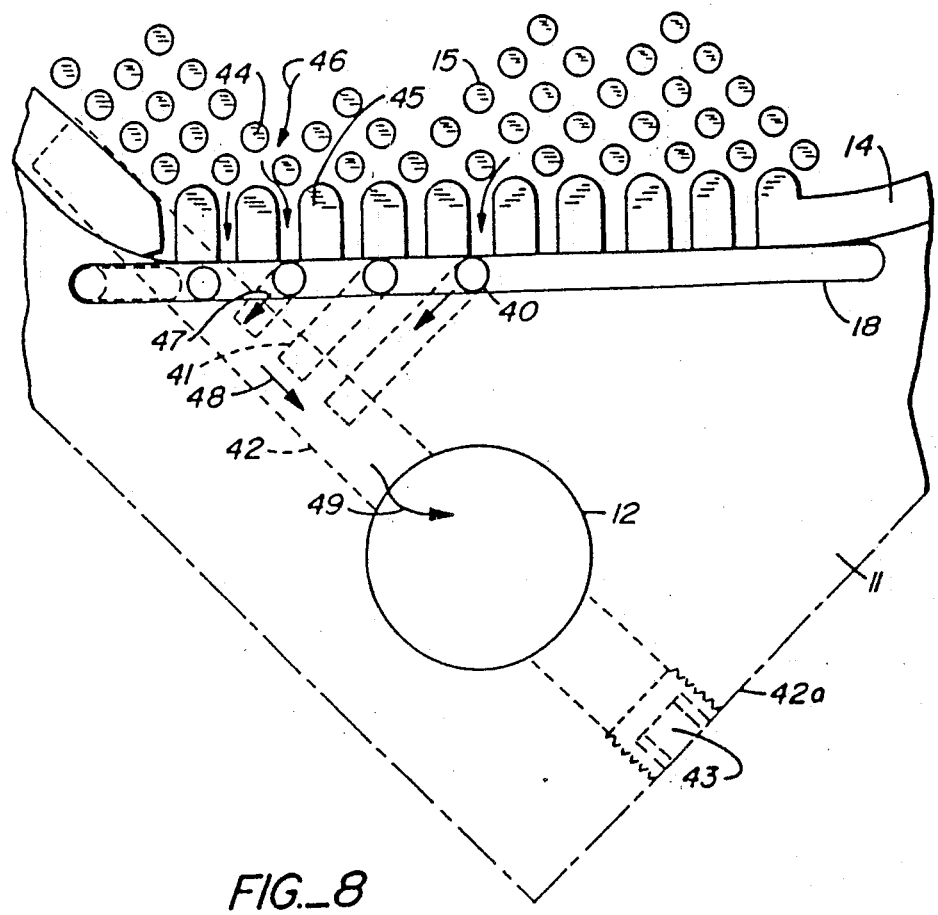
FIG._8
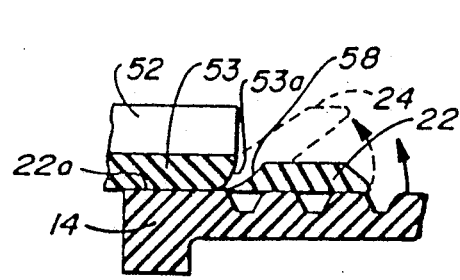
FIG._12
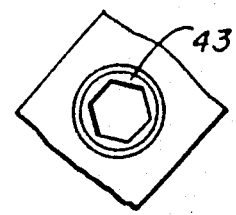
FIG._9

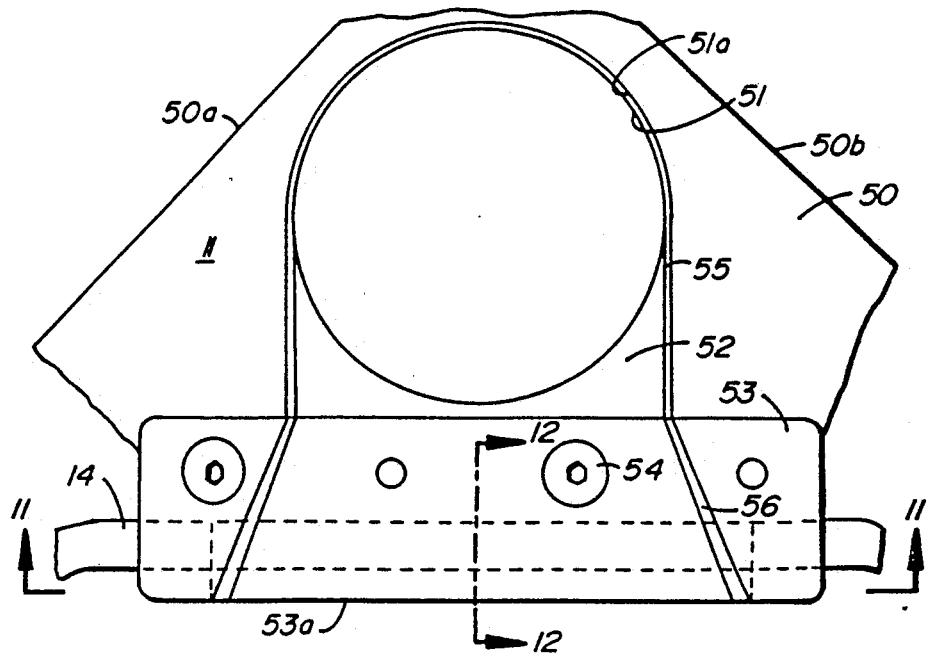
FIG._10
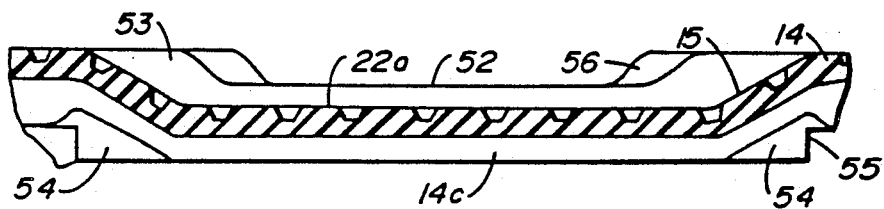
FIG._11
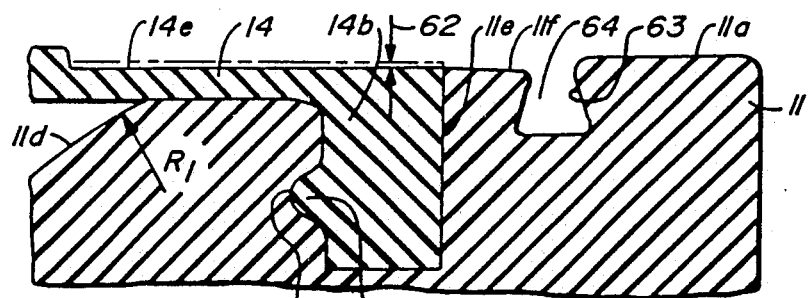
FIG._13

MEMBRANE FILTER PLATE

FIELD OF THE INVENTION

This application is a division of application Ser. No. 307,436, filed Feb. 6, 1989, now U.S. Pat. No. 4,911,839.

FIELD OF THE INVENTION

This invention is directed to a membrane filter plate in which a flexible membrane is operably movable with respect to a rigid filter plate to aid in supporting a fabric media and accommodate an increasing filter cake thickness as the filter cake is deposited in a filtering cycle and in a squeeze cycle is expanded to press the filter cake to remove liquid therefrom thus increasing the % solids in the cake.

More particularly the invention is directed to improvements in membrane filter plates which provide for low elongation and thus increased life of the membrane and a plate/membrane combination which permits various inlet and outlet porting schemes without changing the membrane design.

BACKGROUND OF THE INVENTION

A membrane of the prior art is seen in Neu patent 4,608,164 and is reflected in the Hansen membrane filter plate sold by Hansen-BTR of West Germany. This patent includes an elastomeric (rubber) membrane anchored in a transition zone between a peripheral seal surface of the filter plate and a central recessed filter plate portion. The outer peripheral surface of the membrane adjacent the plate seal surface is higher than the plate seal surface so that when adjacent plates are brought together in a multiplate plate or plate and frame filter press, the membrane periphery is compressed providing a pressure seal between adjacent plates. In the '164 patent a groove is provided around the entire plate including the outlet and inlet and the membrane is formed to generally coincide with the entire operating portion of the plate, i.e. the plate and membrane are designed together so that for any change in plate porting a new membrane must be designed to correspond to the plate porting. The '164 patent particularly the H membrane plate is designed such that at the outer periphery and particularly around the center porting there is a tendency of adjacent membrane portions to suffer considerable elongation (of the older of 30–40%) and thus shorten the lifespan and decrease the efficiency of the membrane. Neu recognizes that membrane folding shortens the useful life (col. 1 lines 61–63). This characteristic is particularly seen in FIG. 4 hereof which illustrates the prior art in which high elongation levels of membranes 30, 31 are present at points A, B and C when the membranes are in the squeeze cycle particularly with little filter cake therebetween. Portions 32 of the membrane are forced by air pressure effecting the squeezing of the cake, into the feed passages leading to the feed eye 34 despite the use of members 33 having curved radiused ($r_2$) outer edges as seen in the lower half of FIG. 5 in the '164 patent. These do not provide effective support of the membranes to minimize elongation.

Further, as seen in FIGS. 13, 14 and 17 of the '164 patent a complex series of ports and grooves must be molded in the respective inlet and outlet corners of the thus perforated membrane, which results in added costs, material wastage, a greater potential for leaks and a loss of flexibility when using plates with different porting arrangements.

SUMMARY OF THE INVENTION

The present invention provides for a plate and imperforate membrane combination in which the plate is provided with a retainer such that the membrane is supported and protected from excessive elongation when it is being utilized in the squeeze mode of operation. Such support is provided around the inlet port(s) by providing, in the case of a center inlet port, a circular retainer of a flexible elastomeric material on each facing plate, around the inlet port and positioned against a margin of the membrane. The retainer pivotably moves when the membrane is pressurized and moved outwardly to squeeze the filter like. At essentially full movement of the diaphragm margin, one retainer abuts a corresponding flexible retainer on an adjacent plate. This prevents collapse of the respective membrane portions on the two plates into the feed eye and the elongation as shown in prior art FIG. 4 hereof is prevented.

In the event a corner-feed inlet is utilized the retainer is of linear configuration and supports the membrane at that area from all but a minimum elongation (up 11 to 20%).

The present invention also envisions having the outer peripheral edges of the membrane below the peripheral seal faces of the filter plates in the filter press. Thus a plastic-to-plastic face seal is provided. This allows the use of a caulked media.

A feature of the present invention allows what may be termed to be a "universal" membrane to be employed, with filter plates having outlet porting at any of the four corners of the filter plate. Thus a membrane need not be dedicated to a particular porting of the plate nor is there a requirement that the membrane itself have ports therethrough adding to the cost of manufacturing, possible plugging, weakening of the structure and reduction of the filtering area. All flow from the membrane is through surface pathways between raised areas, e.g. pips, and raised guideways on the outer surfaces of the membranes. Collection grooves are provided at the corners and on the opposite faces of the plates. Apertures are drilled from the groove bottom to a collection bore in the plate interior which receive flow of filtrate from the membrane surface. The bore in turn conveys that filtrate to the outlet eye in the particular plate corner.

Various embodiments of the flexible retainer are set forth. An improvement in the sealing of the membrane edge into the plate groove has been made by providing a seal bead on the membrane rib and a peripheral side groove in the plate sealing groove. Further, the present invention also includes an embodiment wherein the filter media (cloth) may be caulked in place in a separate outer groove in the filter plate, the so-called CGR option.

BRIEF DESCRIPTION OF THE DRAWINGS

FIG. 1 is a plan view of the filter plate and a membrane mounted thereon.

FIG. 1A is a plan view of a peripheral segment of the plate and membrane of FIG. 2.

FIG. 2 is a cross-sectional partial view of the filter plate showing membranes on each side with a membrane support retainer adjacent a center inlet port, taken on the line 2—2 of FIG. 1.

FIG. 3 is a cross-sectional view of one embodiment of the support retainer.

FIG. 4 illustrates excessive elongation of a prior art membrane during the squeeze mode of operation,.

FIG. 5 is a partial cross-sectional view illustrating the support action of a pair of retainers for two facing membranes.

FIG. 6 is a partial cross-sectional view of the retainer and the membrane showing attachment of the retainer to a clamp ring surrounding a center feed inlet and the position of the filter media.

FIGS. 7A, 7B and 7C are schematic side views of various embodiments of the retainer.

FIG. 8 is a plan view of one corner of a filter plate illustrating the flow of filtrate along the membrane surface and into a plate collection groove and plate portion leading to a corner outlet eye in the filter plate.

FIG. 9 is a side view of the plug closure for an exit bore in the plate leading to the outlet eye.

FIG. 10 is a top view of a corner feed inlet embodiment of the invention, including a clamped linear retainer for the membrane.

FIG. 11 is a partial cross-sectional front view of the corner inlet of FIG. 10 taken on the line 11—11 of FIG. 10.

FIG. 12 is a partial cross-sectional end view of the corner inlet taken on the line 12—12 of FIG. 10 showing movement of the retainer outwardly to a position (dotted) abutting the linear clamp plate.

FIG. 13 is a partial cross-sectional view of a further embodiment of a membrane-to-plate seal and a caulked-in-place fabric media connection.

DETAILED DESCRIPTION

In FIG. 1, a membrane filter plate 10 comprises a plastic filter plate 11 such as polypropylene having filtrate outlet eyes 12 at one or more corners and planar elastomeric (such as synthetic rubber) molded membranes 14 normally mounted on each side of the plate. Each membrane is essentially covered with upstanding pips 15 such as truncated cones. Line 15a indicates the outer periphery of the outer pips, which line is inboard of the peripheral edge 14a of the membrane(s). A central feed inlet eye 16 may be at, or displaced from, the geometric center of the plate. A series of stay bosses 17, preferably circular, four being shown, may be provided to provide mid-span support of the filter plate 11. A fabric filter media cloth is placed over the membrane. As known in the art, the media fabric may be grommeted at its outer edges and stretched and tied by conventional wire ties at the top and sides of plate. Adjacent each membrane corner edge are a series of arch-shaped raised areas 45 having a top flat surface corresponding to the height of the pips. As explained in more detail with respect to FIG. 8, the low areas or gullies between the pips and raised areas 45 form flow paths through which filtrate which has passed through the media, in turn passes to one or more filtrate collection channels 18. The filtrate then passes through plate passageways 41 and bore(s) 42 to filtrate outlet eye(s) 12. It is thus seen that there are no through passages or cutouts in the imperforate membranes. Only flat drain surfaces extend between the pips 15 and raised areas 45.

Attachment and support of the membrane(s) at the feed inlet eye and at the plate periphery is seen in FIG. 2. In the region of the plate transition zone 11d, between the plate seal surface 11d and the plate recessed filtering zone 11c, is a peripheral groove 11b. An outer periphery of the membrane 14 (shown in its neutral essentially planar position) has a continuous inwardly-extending rib 14b which is forced into groove 11b to anchor the membrane in the plate 11. As is known in the art, a bore 9 is provided in the end of the plate for connection to a compressed air or other fluid source (not shown) and entry of pressurized air or fluid to the volume 66 between the backside (non-pipped) of the membrane and the plate recess 11c which functions to move the membranes outwardly as seen in FIG. 5 to press in a squeeze mode filter cake previously deposited on the filter media cloth (FIG. 6) in the filtering mode of operation. The outer surface 14e of the membrane adjacent the plate seal face is at a level slightly below and inward of the seal surfaces 11a so that the entire plate-to-plate seal is 18 along surfaces 11a of adjacent plates forming a filter press stack of plates or plates and frames or to a recessed plate or grooved flat plate abutting thereto without a membrane. FIG. 2 also illustrates stay boss 17 which helps support the plate at mid-span(s). Pips 15 are normally omitted on the membrane in a circular area 14f where the membrane covers the flat-top of the stay bosses 17.

A doughnut-shaped elastomeric (urethane, rubber or thermoplastic) retainer 22 is provided surrounding the center line 16a of a central feed port or eye 16. A circular shallow groove 11e is provided in the plate recessed zone to receive a relatively short inwardly-extending circular rib 14c of the membrane. The integral tab base portion 22a (FIG. 3) of the retainer is mounted against and parallel to the outer edge of the membrane surrounding the inlet eye and clamped thereagainst by metal, e.g stainless steel or bronze, clamping rings 19, 20 having a curved outer peripheral edge 21. Mechanical connectors connect the rings and pass through apertures 22c in the retainer tab. The remainder of retainer 22 extends cantilevered from the clamped base portion parallel to the membrane and is movable into dotted position 24 about a pivot point at the junction with tab portion 22a, when the membrane is expanded by internal air pressure in chamber 66 in the direction of arrow 25. The edge 23 of the retainer which faces ring edge 21 is pushed and pivoted by membrane portion 14d until surfaces 23 and 21 abut, thus supporting the membrane and preventing elongation of the type shown in prior art FIG. 4.

As seen in FIG. 3, the elastomeric retainer or support 22 is surrounded by a fabric 22b, a sewn extension of which also forms the integral tab portion 22a. Tab portion may also be an integral elastomeric extension of support 22 and be of various shapes as seen in FIG. 7.

As seen schematically in FIG. 5, when two facing membranes are internally pressurized and move outwardly from its associated plate as seen by arrows 67 to squeeze a filter cake 8 deposited on fabric media 28 provided on each of the facing membrane surfaces, they move the retainer 22 from the dotted position 24 where they eventually abut at 26 and essentially prevent any further movement and elongation of portions 14d of the membranes. When the squeeze cycle is finished and the pressed cake dumped (not shown), stored energy in the hinged retainers tend to push the membranes back to their original planar condition. This return action is completed when the fluid pressure incident to the start of the filter cycle and flow of liquid slurry to be filtered into the inlet port tends to force the retainers apart back to the dotted position 24 and builds up pressurization for filtering in the volume 68 between the facing membranes. As seen in FIG. 5, the rings 19 (and 20) are clamp-mounted around the inlet eye 16 by recessed bolts 27a extending from ring 19 to tapped apertures in ring 20 (not shown).

FIG. 6 illustrates the positioning of filter media fabric 28 such as nylon woven cloth around the outside of retainer 22 and over the tops of the pips 15 on the membrane outer face. Further, a plastic, wire or other fabric, or other reinforcement 29 may be provided in the retainer. The retainer may also be sealed or bonded to the membrane so it moves therewith. The tab 22a is clamped to the plate underneath a washer 27b and head of bolt 27a. A clip nut media anchor 69 or a barrel neck option, as known in the art, is used to clamp the filter media.

As seen in FIG. 7A, a V-shaped groove 35 may be formed in the retainer and a base portion 35a clamped to the plate as in FIG. 5. A reinforcement 36 may also be utilized. As seen in FIGS. 7B and 7C, a sinqle U-shaped groove 37 or a U-shaped and V-shaped groove 38, 39 provided on opposite sides of the retainer can be utilized to obtain various degrees of support and different flex points to an associated membrane portion.

FIG. 8 details the flow of filtrate from a corner surface of membrane 14 to plate 11. Each pip 15 has a flat top surface 44 as do the arch-shaped raised areas 45. Fabric media is positioned over and is supported by these flat surfaces. In the filtering cycle, filtrate passes through the media and flows as shown by arrow 46 through low areas or pullies between the pips and raised corner areas 45 into a linear open collection groove(s) 18 in the plate. A series of oblique apertures 41 are drilled from the collection groove bottom at positions 40 to a transverse internal bore 42 extending from a plate edge 42a to beyond an intersection with outlet eye 12. As seen in FIG. 9, bore 42 is closed by a plug 43. Arrows 47, 48 and 49 illustrate the flow of filtrate in these passageways to the outlet port or eye 12 of each plate. Filtrate is thus removed from the series of stacked plates through the aligned outlet eyes of each plate. Dependent on the particular filter press installation, groove drilling forming apertures 41 may be at one or more corners of the plate. If no drilling is done in a particular corner, that corner is in effect a blanked outlet.

FIG. 10 shows a plate corner inlet 50, the corner being formed by the intersection of lines 50a and 50b. An inlet eye 51 having a bevelled entrance and exit 51a passes completely through plate 11. A relatively wide and flat flow gulley 52 about 9 mm deep extends from eye 51, is flared laterally at 56 and extends to a position adjacent the inboard edge 53a of a metal clamp plate 53 connected to plate 11 by countersunk fasteners 54. Clamp plate 53 (FIG. 11) is of shallow U-shape and its top surface is a continuation of gulley 52 thus permitting entry of the liquid slurry to be filtered from the inlet eye to between a pair of facing membranes. Plate 53 clamps a portion of the membrane and a portion of rib 14c to the plate. The tab 22a of retainer 22 and fabric media thereover are also clamped at the membrane corner. A machined step 55 is seen in plate 11 at the corner of the volume thereabove which may be filled with a silicon rubber to provide for transition and support of the membrane at the inlet corner.

FIG. 12 shows the mounting of a linear form of retainer 22 along the inner linear edge 53a of clamp plate 53. Membrane movement in the cake squeeze mode pushes the retainer 22 to dotted position 24 and upon abutment of the facing edges 53a and 58, further elongation of the membrane is prevented at that point.

FIG. 13 illustrates three other features of the invention. The top surface 14e of the membrane outer periphery is at a position below the sealing face 11a of the plate periphery as shown by arrows 62. The transition zone 11d of the plate preferably has a convex radius $R_1$ of about 25 mm to minimize membrane elongation at the outer peripheral portion 14e of the membrane. A caulk groove 63 and depressed edge 11f is machined in the seal face to accommodate the outer edges of the filter media in a space 64. The fabric media is thus all below the face 11a and does not interfere with the face-to-face seal of the adjacent plates. A lateral curved side bead 61 is provided on the inner surface of membrane rib 14b which bead is forced into a corresponding side indentation 60 extending in plate groove 11e. The side bead 61 provides enhanced sealing of the rib 14b in groove 11e.

The above description of embodiments of this invention is intend to be illustrative and not limiting. Other embodiments of this invention will be obvious to those skilled in the art in view of the above disclosure.

I claim:

1. In combination, a filter plate having a recessed filtering zone, a peripheral sealing zone surrounding the filter zone and a transition zone peripherally extending between said filtering and peripheral zones;

means for providing an alternative to a ported membrane, including at least one essentially planar flexible elongatable imperforate membrane having an outer periphery anchored adjacent to said peripheral zone and pip means on said membrane for supporting a filter media, said membrane extending across said filtering and transition zones;

wherein said filter plate contains at least one open collection groove in a face surface of said plate adjacent to one or more edges of said filter plate, a through-plate outlet port and passage means in said plate interconnecting said collection groove to said outlet port; and wherein an outer edge of said membrane is positioned juxtaposed to said collection groove and filtrate from a slurry being filtered is passed through said filter media, passes around said pip means and exits at said membrane outer edge into said connection groove for disposal through said outlet port.

2. The combination of claim 1 wherein said membrane outer edge includes a series of arch-shaped raised areas for directing filtrate from around said pip means to said collection groove.

3. The combination of claim 2 further wherein said passage means comprises a transverse bore extending from an edge of said filter plate and intersecting said outlet port, and oblique apertures extending from said collection groove to said bore for exiting filtrate to said outlet port.

4. The combination of claim 1 further including a transverse bore extending from an edge of said filter plate and intersecting said outlet port, and oblique apertures extending from said collecting groove to said bore for exiting said filtrate to said outlet port.

* * * * *